United States Patent
Arlitt et al.

(10) Patent No.: US 9,466,087 B2
(45) Date of Patent: Oct. 11, 2016

(54) METER DATA MANAGEMENT TESTING

(71) Applicant: Hewlett-Packard Development Company, L.P., Houston, TX (US)

(72) Inventors: Martin Arlitt, Calgary (CA); Manish Marwah, Palo Alto, CA (US); Amip J. Shah, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 649 days.

(21) Appl. No.: 13/912,344

(22) Filed: Jun. 7, 2013

(65) Prior Publication Data
US 2014/0365174 A1 Dec. 11, 2014

(51) Int. Cl.
  *G01D 21/00* (2006.01)
  *G06Q 50/06* (2012.01)
  *G06Q 10/00* (2012.01)
  *G01D 4/00* (2006.01)

(52) U.S. Cl.
  CPC .............. *G06Q 50/06* (2013.01); *G06Q 10/20* (2013.01); *G01D 4/002* (2013.01); *Y02B 90/241* (2013.01); *Y04S 20/32* (2013.01)

(58) Field of Classification Search
  CPC .. G06Q 50/06; G06Q 10/20; G06Q 30/0202; G01D 4/002; G06F 11/3672; G06F 11/3684
  USPC ........... 702/121, 122, 123, 182, 183, 60, 61, 702/62; 705/7.29; 707/636, 670, 690; 717/124; 340/870.02
  See application file for complete search history.

(56) References Cited

U.S. PATENT DOCUMENTS

| | | | | |
|---|---|---|---|---|
| 7,994,934 B2* | 8/2011 | Kagan | .................... | G01D 4/004 324/76.11 |
| 8,818,838 B1* | 8/2014 | Sharma | .............. | G06Q 30/0202 705/7.29 |
| 8,862,557 B2* | 10/2014 | Glasser | ............... | G06F 11/3684 707/690 |
| 2006/0184918 A1* | 8/2006 | Rosaria | ............... | G06F 11/3672 717/124 |
| 2012/0209584 A1* | 8/2012 | Floyd | .................... | G01D 4/002 703/17 |
| 2012/0232915 A1 | 9/2012 | Bromberger | | |

FOREIGN PATENT DOCUMENTS

WO  WO-2009013762  1/2009

OTHER PUBLICATIONS

"Accelerated Solution for Smart Meter Platforms"; Capgemini; Jun. 24, 2011; 4 pages.
IBM Software; "Unprecedented performance and scalability demonstrated for meter data management"; Aug. 2011; 4 pages.
White Paper; "Benchmark Testing Results: Unparalleled Scalability of Itron Enterprise Edition on SQL Server"; May 2011; 18 pages.

* cited by examiner

*Primary Examiner* — John H Le
(74) *Attorney, Agent, or Firm* — Hewlett Packard Enterprise Patent Department

(57) ABSTRACT

Examples of meter data management testing are disclosed. In one example implementation according to aspects of the present disclosure, a computing device may include one or more processors, a memory for storing machine readable instructions, and a data store. The computing device may further include a meter data management testing module stored in the memory and executing on at least one of the one or more processors to test a meter data management system using a data set of representative metering data and a user-generated test scenario specifying a plurality of metering parameters.

13 Claims, 4 Drawing Sheets

400

Testing Scenario

402 — Name: _____
404 — Data: [ ] synthetic [ ] empirical [ ] hybrid
406 — # Meters: _____
408 — Metrics:
  [ ] electricity – kWh
  [ ] electricity – kVar
  [ ] gas – m$^3$
410 — Recording Frequency:
  [ ] 5 min [ ] 10 min [ ] 15 min [ ] 30 min
412 — Load Type: [ ] Batch [ ] Trickle
414 — VEE:
  [ ] Spike Check
  [ ] Rise Check
  [ ] Gap Check
416 — Analyses:
  [ ] Time of Usage Billing
  [ ] Fraud Detection 418 — [ Submit ]

*Fig. 4*

METER DATA MANAGEMENT TESTING

BACKGROUND

Utility companies may use devices, such as water, gas, and electric meters, to monitor customer utility usage, such as water usage, gas usage, and electricity usage, respectively. The growing economic, environmental, and social concerns over the resource consumption of buildings, campuses, cities, and enterprises is resulting in the deployment of extensive metering infrastructures to provide more detailed consumption information.

For example, utility companies have begun using sensors or "smart meters" (meters networked together) to collect and transmit data, including utility usage data. Efforts are also underway to extend these infrastructures to control the resource usage, such as through the use of actuators. These infrastructures may allow for the management of the infrastructure and the collection of data, such as utility consumption data, through a network, which may include advanced meter infrastructure (AMI) or advanced meter reading (AMR).

BRIEF DESCRIPTION OF THE DRAWINGS

The following detailed description references the drawings, in which:

FIG. 4 illustrates a user interface of a meter data management testing system according to examples of the present disclosure.

DETAILED DESCRIPTION

Figure 1:
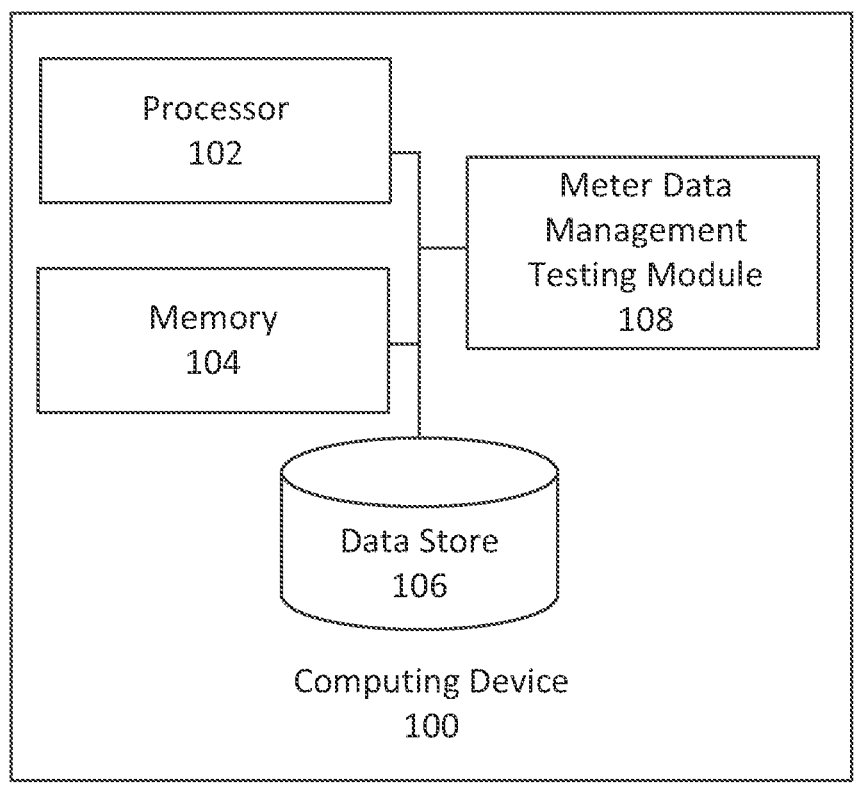
FIG. 1 illustrates a block diagram of a computing device for meter data management testing according to examples of the present disclosure.

Utility companies have begun using sensors or "smart meters" (meters networked together) to collect and transmit data, including utility usage data, and actuators for controlling utility usage. A utility company may desire the ability to manage the smart meter and actuator infrastructure, known as advanced meter infrastructure (AMI) or advanced meter reading (AMR) system. The implementation of smart metering infrastructures may result in the utility companies collecting many orders of magnitude more data than they have traditionally gathered and stored. Meter data management (MDM) systems may enable utility companies to store and analyze these huge collections of data.

A utility company may need to confirm a priori if a particular MDM system or configuration will satisfy a utility company's particular performance and scalability expectations. If a utility company's MDM system performs or scales poorly, it could undermine the significant investment the utility company has made in deploying the smart meter infrastructure. Therefore, a utility company may wish to evaluate the performance and scalability of an MDM system before the utility company invests the time and money to deploy the MDM and the smart meter infrastructure.

Currently, utility companies attempt to evaluate meter data management systems in one of several ways. First, a utility company may utilize generic benchmarking studies. However, these generic, "static" studies fail to address or answer all questions that a utility company may have regarding its own unique requirements. Moreover, these studies fail to allow for any type of custom testing based on a particular utility company's requirements.

Second, a utility company may work with vendors to set up a custom benchmarking environment to match its specific needs. This approach, however, may be time consuming and expensive for the vendors and/or the utility company, although it may provide more detailed information to the utility company. This approach may also provide inflexibility regarding making changes to the requirements or may require extensive time to change or re-run testing if the utility company wishes to change any parameters in the testing scenario.

Various examples of meter data management testing are disclosed below. The meter data management testing may enable experimental demonstration of the capabilities, performance, and scalability of a specific meter data management system or across multiple deployment scenarios. For example, the meter data management testing may be used by a utility company to test and benchmark a given meter data management system for various advanced meter infrastructure (AMI) deployment configurations.

In some implementations, the meter data management testing may use a synthetic dataset generator to enable testing at various scales, which may also incorporate some real-world data from a utility company. In one example, the meter data management testing may also use a multi-platform benchmarking engine to enable a utility company to compare different data sets across different analytic scenarios. Additionally, in one example, the meter data management testing may enable the evaluation of these data sets for a meter data management and AMI benchmarking scenario by providing for various configuration and application scenarios. The meter data management testing may reduce the cost and time associated with meter data management benchmarking. The meter data management testing may also enable vendors to learn about potential performance and scalability issues with their MDM systems proactively before deploying them. These and other advantages will be apparent from the description that follows.

FIG. 1 illustrates a block diagram of a computing device 100 having a data management testing module 108 for data management testing according to examples of the present disclosure. The computing device 100 may include a processor 102, a memory 104, a storage device 106, and the meter data management testing module 108. It should be understood that the computing device 100 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like.

The processor 102 may be configured to process instructions for execution by the computing device 100. In one example, an additional processor or processors (not shown) may be used. The instructions may be stored on a non-transitory tangible computer-readable storage medium, such as in the memory 104 or on a separate device (not shown), or on any other type of volatile or non-volatile memory that stores instructions to cause a programmable processor to perform the techniques described herein. Alternatively or additionally, the example computing device 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The data store 106 of the example computing device 100 may contain user data and/or meter data management testing data. In one example, the data store 106 may be a hard disk drive or a collection of hard disk drives (or other similar type of storage medium). The data store 106 may be included in the example computing device 100 as shown, or, in another example, the data store 106 may be remote from and communicatively coupled to the computing device 100 such as via a network. The data store 106 may also be a collection of multiple data stores. In one example, the data store 106 may be an entire data store server or a collection of data store servers configured to store large amounts of data.

The meter data management testing module 108 may enable a user to test and benchmark a meter data management system, such as, for example, a meter data management system for various advanced meter infrastructure (AMI) deployment configurations. In one example, the meter data management testing module 108 may enable a user to generate synthetic data representative of an AMI deployment. In this way, the user may test and benchmark various configurations of meter data management for proposed AMI deployments in a "real world" simulation without requiring a functioning AMI deployment. Additionally, the user may upload real, empirical data collected from actual AMI deployments. In another example, empirical data may be used to generate a new, larger data set, which is a hybrid of the empirical data set and a synthetic data set. This approach may be desired if a utility company has some real world data but wishes to expand the data to test the performance and scalability of a meter data management system in a larger deployment.

The meter data management testing module 108 may receive user input from a user via a user interface. For example, a user may input a metering testing scenario, which may include a variety of parameters, such as number of meters, type of meters, frequency of data collection, type of testing analysis, and others as appropriate. The meter data management testing module 108 may offer the user options for testing scenarios and/or options for parameters, or the meter data management testing module 108 may enable free-form input by the user. In one example, the user may upload a script or other pre-configured testing scenario for testing.

The meter data management testing module 108 may then utilize one or more of several different modules to facilitate testing the meter data management system, as discussed below regarding FIG. 2.

Figure 2:
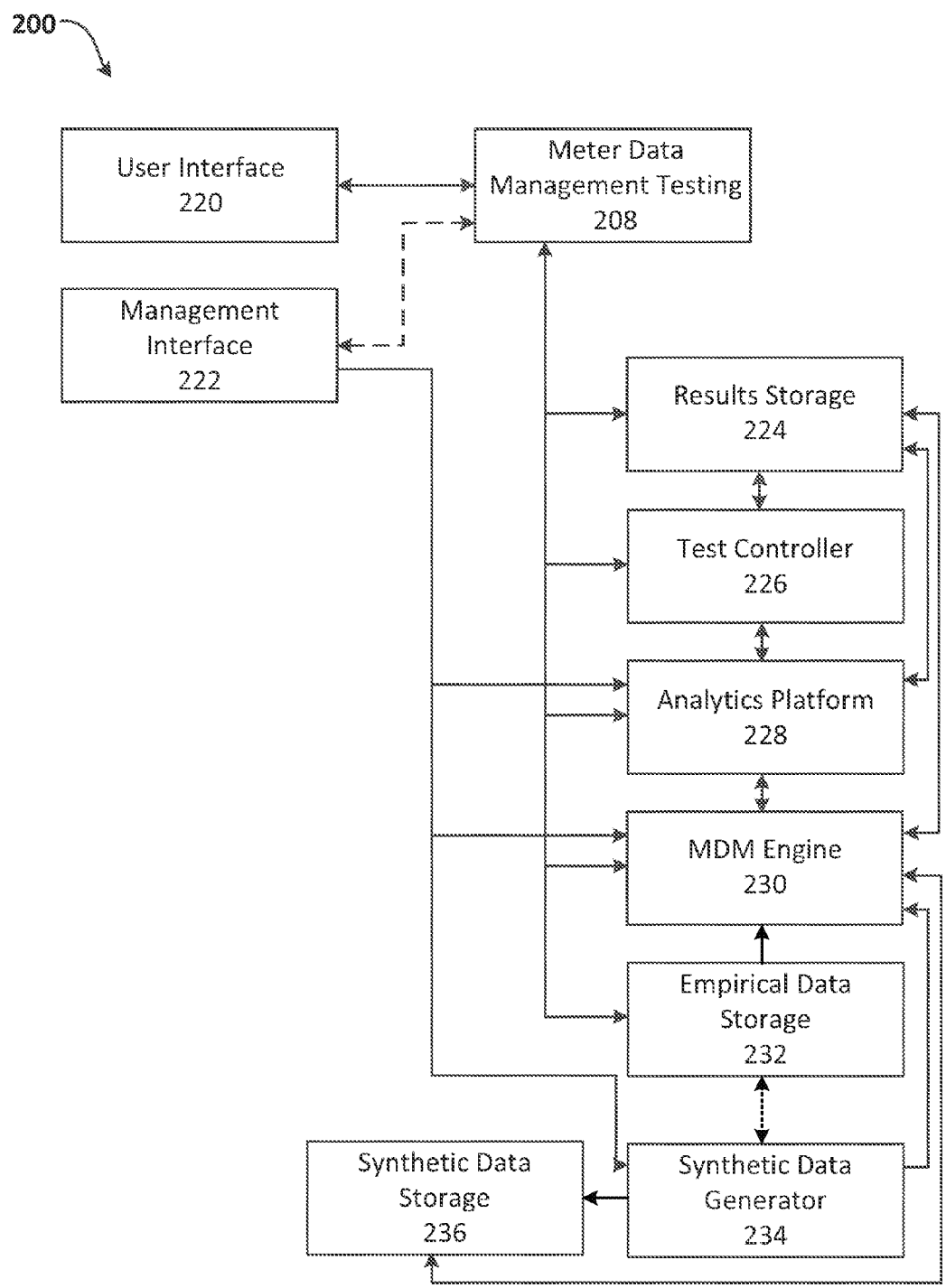
FIG. 2 illustrates a block diagram of a system for meter data management testing according to examples of the present disclosure.

FIG. 2 illustrates a block diagram 200 of a system for meter data management testing according to examples of the present disclosure. The block diagram may include, for example, a meter data management testing module 208, a user interface module 220, a management interface module 222, a results storage module 224, a test controller module 226, an analytics platform module 228, an MDM engine module 230, an empirical data storage module 232, a synthetic data generator 234, and a synthetic data storage module 236.

A user may interact with the meter data management testing system using a user interface via the user interface module 220. The user interface module 220 may guide a user through a set of steps to begin a new test, for example. An example user interface is illustrated in FIG. 4 and is discussed below. The user interface module 220 may be a web interface, an application, or a command line interface. For example, using the command line interface, the user may upload a script or SQL command that describes the experimental testing scenario. With the web interface or application, the user may select and/or enter various parameters and variables for running the testing scenario, for example. In one example, the user may be presented with a visual interface containing the basic elements that the user can manipulate to define the testing scenario, such through the screen shot shown in FIG. 4. The user may also select from any available pre-defined testing scenarios or select from any previously configured testing scenarios. The user interface module 220 may communicate with the meter data management testing module 208 to convey the user's input and the testing scenario.

The meter data management testing module 208 may convert the user input received from the user interface module 220 into a set of instructions that may determine which of the following modules may be used and in which order to carry out the testing scenario. For example, if the user wishes to use empirical data, the meter data management testing module 208 may determine that it should utilize the empirical data storage module 232. A user may provide a link to an empirical data set that may be used in performing the testing scenario. The meter data management testing module 208 may then download or otherwise access the empirical data set indicated by the user and store it in the empirical data storage module 232. The data management testing module 208 may also access previously downloaded empirical data from the empirical data storage module 232.

In another example, the user may desire to generate a synthetic data set based on an indicated set of parameters and variables, such as the number of meters, the collection periods and frequencies, the type of data collected, etc. If synthetic data is desired, the synthetic data generator module 234 may create an entirely synthetic data set, in one example. In another example, the synthetic data generator module 234 may retrieve some empirical data from the empirical data storage module 232 to create a hybrid data set. The synthetic data generator module 234 may then characterize the empirical data and use the characterization results to create the hybrid data set, which is synthetic but has characteristics in common with the retrieved empirical data set. In this way, a small amount of real world data may be used to test a larger meter data management system.

The output from the synthetic data generator module 234 may be stored in a synthetic data storage module 236 for later use, for example, or loaded directly into the MDM engine module 230 for testing. In one example, the data management testing system may have multiple MDM engine modules for the purpose of conducting various comparison tests of different meter data management systems. These comparison tests allow a utility company to test many different scenarios on different meter data management systems.

The test controller module 226 may prompt the user, via the user interface module 220, for variables, parameters, and/or test conditions for use in the testing scenario. The test controller module 226 may also include some pre-defined or prior testing scenarios, for example, and may also enable the user to create custom testing scenarios. The custom testing scenarios may be saved, for example, and may be modified and/or deleted, if desired.

The meter data management testing module 208 may also allow for real-time testing and/or batch-load testing. Once the data set has started loading (in an example utilizing real-time testing) or once the data set has completely loaded (for batch-load testing), the meter data management testing module 208 may instruct the analysis platform module 228 to begin performing an analysis or multiple analyses (for comparing between various meter data management systems, for example) of the data. By performing these analyses, the user may test the performance (e.g., response time, accuracy, etc.) of the meter data management systems at scale for the data set of interest.

In the case of a multiple analysis example, the meter data management testing module 208 may be responsible for scheduling the various analyses appropriately so as to avoid any unintended resource conflicts on the meter data management testing system. Once the results of the analysis or analyses are compiled, the results may be stored in a results storage module 224. The meter data management testing module 208 may instruct the user interface module 220 to display the results to the user or to notify the user that the results are ready for viewing.

The meter data management testing module 208 may also take other actions. For example, the meter data management testing module 208 may send the user a message such as an SMS message, email message, or other suitable message to alert the user when the results are ready. The meter data management testing module 208 may also generate an automated report that includes the results from a specific test, tests, or analyses. In one example, the meter data management testing module 208 may send the report to the user or store it for later viewing.

The meter data management testing module 208 may also be augmented to provide additional functionalities to the user. For example, a user may prefer to modify and repeat a previously created experiment in the test controller module 226. In this case, the meter data management testing module 208 may retrieve the information from a data store, such as storage device 106 of FIG. 1, in order to be displayed by the user interface module 220. The meter data management testing module 208 may also facilitate the sharing of results among various users.

Figure 3:
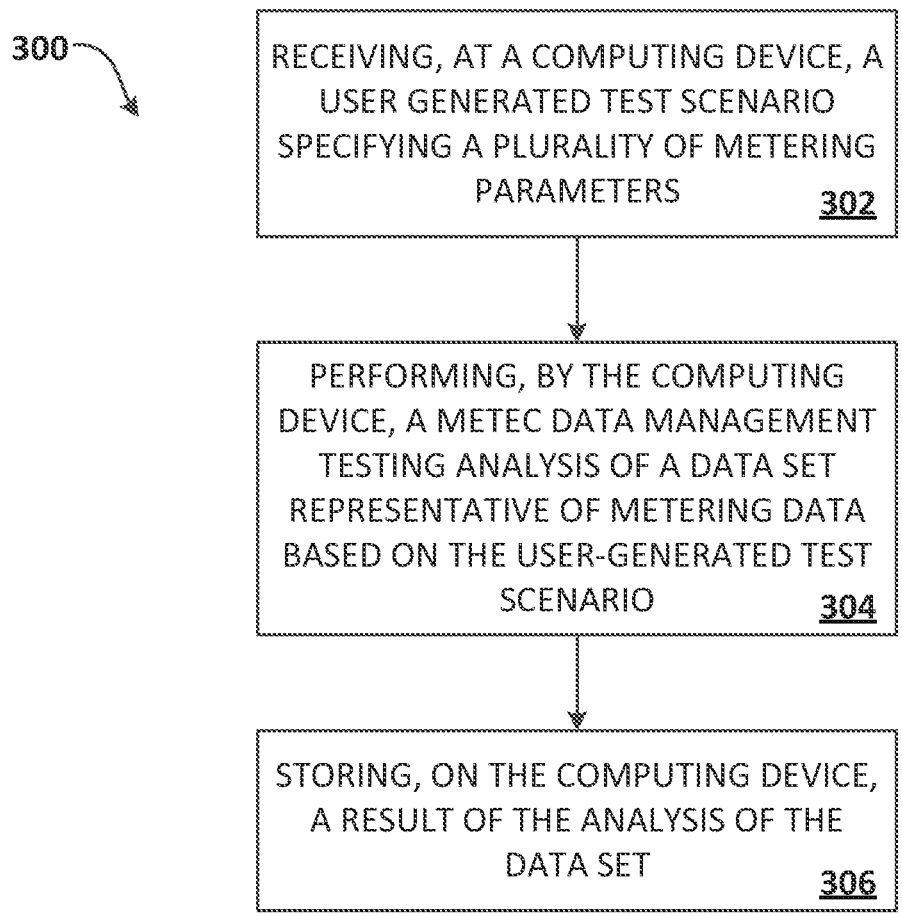
FIG. 3 illustrates a flow diagram of a method for meter data management testing according to examples of the present disclosure.

FIG. 3 illustrates a flow diagram of a method 300 for meter data management testing according to examples of the present disclosure. The method may be performed, for example, by the computing device 100 and the system 200 shown in FIGS. 1 and 2 respectively, or by another similarly suited device.

The method 300 may include: receiving, at a computing device, a user-generated test scenario specifying a plurality of testing parameters (block 302); performing, by the computing device, a meter data management testing analysis of a data set representative of metering data based on the test scenario (block 304); and storing, on the computing device, a result of the analysis of the data set (block 306). Additional processes also may be included, and it should be understood that the processes depicted in FIG. 3 represent generalized illustrations, and that other processes may be added or existing processes may be removed, modified, or rearranged without departing from the scope and spirit of the present disclosure.

At block 302, the method may include receiving, at a computing device, a user-generated test scenario specifying a plurality of metering parameters, in one example. In one implementation, the user may enter a script describing a test scenario, or the user may enter or select various parameters to configure the test scenario, in another implementation. The user may also select a pre-configured test scenario from a list of test scenarios displayed by the user interface.

At block 304, the method may include performing, by the computing device, a meter data management testing analysis of a data set representative of metering data based on the test scenario, in one example. The data management testing analysis may utilize the test scenario to perform a test or series of tests to evaluate the performance of a meter data management system, for example, based on a data set. The data set may include a synthetic data set, an empirical data set, or a hybrid data set of synthetic data generated from an empirical data set.

In one example, the method may further include generating, by the computing device, a synthetic data set representative of metering data. The generating of the synthetic data set may also include generating the synthetic data set from an empirical data set representative of metering data uploaded or selected by the user.

At block 306, the method may include storing, on the computing device, a result of the analysis of the data set, in one example. The result of the testing may be stored in a text or other file, for example, or may be displayed to the user on the user interface. In an implementation where the test may take a long time to complete, the result may be stored and the user may be notified by electronic message or other method that the test is complete. The result may also be sent to the user.

FIG. 4 illustrates a user interface 400 of a data management testing system according to examples of the present disclosure. The user interface 400 provides merely one example of a user interface for a meter data management testing system for testing the capabilities, performance, and scalability of a meter data management system. The user interface 400 may be one example user interface displayed by user interface module 220 in FIG. 2, for instance. In one example, the user interface can guide a user through a set of inputs and/or steps to begin a new testing scenario, The user may enter a name 402 for the testing scenario so that the user may refer back to the testing scenario by name later.

The user may then select a type of data 404 to be used in the experiment. For example, the user may select "synthetic" data, "empirical" data, or a "hybrid" of both synthetic and empirical data. As discussed herein, the synthetic data may be generated by the meter data management testing system, while the empirical data may be representative data from a utility company. In one example, if the user selects an empirical data set, then the user interlace 400 may present to the user an option to specify the location of the empirical data to load into the meter data management testing system. In another example, the user interface 400 may present to the user a list of empirical data sets already loaded from which the user may select a desired empirical data set. The hybrid data may represent synthetic data generated from the empirical data so that the synthetic data may be representative of real, empirical data from a utility company. If the user selects a hybrid data set, then a combination of the options from the synthetic and empirical data set options may be made available to the user.

The user may also enter a number of meters 406 for the experiment. The entry may be a free-form entry so that the user may enter any number of meters, in one example. In another example, the user may select from a desired number of meters ((e.g., 10,000; 100,000; 1,000,000).

The user may select the metric or metrics 408 for which the user would like to receive data results. For example, the user may desire to have data returned for electricity meters with a kWh or kVar measurement or for gas meters with a $m^3$ measurement.

The user may also select a recording frequency 410 for recording consumption data. For example, consumption data may be recorded every five minutes, ten minutes, fifteen, minutes, thirty minutes, or some other amount of time. In one example, the frequency options may be selectable by the user. In another example, the user may enter a free-form time period for the recording frequency.

The user may select a load type 412, indicating whether the data is collected at one time in a batch or streamed over time in a trickle.

Additionally, the user may select a data quality management preference. The data quality management preference may be responsible for extracting data, converting the data from a first format to a second format (or from one unit of measure into another unit of measure), imputation of missing values, detecting and discarding invalid or improbable data (or sequence of data), and/or combining data from different or multiple sources.

In one example, the data quality management may include a validation, estimation, and editing (VEE) preference 414. In some situations, empirical data may be imperfect (e.g., readings may be missing), so data quality management or VEE may be performed to assess the quality of the data. If possible, the data quality management or VEE may correct and/or improve the data, in one example. Synthetic data may also be generated with imperfections to enable performance testing of the data quality management or VEE functionality provided by the meter data management testing system. In one example, data quality management or VEE may be performed using the same or similar tools as the analysis (e.g., SQL scripts).

In one example, the user may select "spike check" as the data quality management or VEE preference. The spike check may search for spikes in the meter load. The user may also select "rise check," which may search for continuous rises in the meter load. The user may also select "gap check", which searches for gaps in meter load measurements, calculates gap durations and determines the percentage increase. Other data quality management or VEE preferences may be used in other examples.

The user may also select a type of analysis 416 to be performed. For example, the user may select a time of usage billing analysis or a fraud detection analysis.

Once the user has made the appropriate selections or entered the required information, the user may submit 418 the testing scenario for testing.

In another example, the user interface 400 may include options for the user to enter SQL or other database commands to perform analyses of various meter data management systems or the ability to upload scripts that the user interface 400 may pass to the system. In another example, the user interface 400 may enable the user to enter quality of service requirements for the tests. For instance, the user could indicate that the specified number of meters that expect the time of usage billing analysis to complete within a certain time period. In this example, the service may determine which test results satisfy the quality of service requirements. In another example, the user interface 400 may enable the user to enter the concurrency requirements, to evaluate the system's ability to perform multiple instances of the selected analyses in parallel.

The user interface 400 may then present these results to the user in a variety of ways, including in text or through a visual representation such as a green indicator for a passed test and a red indicator for a failed test, although many presentation options may be available.

The test results may be presented as text file or a set of text files. For example, a text file may contain example test data as follows:

| | |
|---|---|
| 00:00:00 | 1/04/2013\|0\|648 |
| 01:00:00 | 1/04/2013\|0\|548 |
| 02:00:00 | 1/04/2013\|0\|603 |
| 03:00:00 | 1/04/2013\|0\|454 |
| 04:00:00 | 1/04/2013\|0\|379 |
| 05:00:00 | 1/04/2013\|0\|454 |
| 06:00:00 | 1/04/2013\|0\|419 |
| 07:00:00 | 1/04/2013\|0\|453 |
| 08:00:00 | 1/04/2013\|0\|1892 |
| 09:00:00 | 1/04/2013\|0\|684 |
| 10:00:00 | 1/04/2013\|0\|782 |
| 11:00:00 | 1/04/2013\|0\|611 |
| 12:00:00 | 1/04/2013\|0\|709 |
| 13:00:00 | 1/04/2013\|0\|646 |
| 14:00:00 | 1/04/2013\|0\|669 |
| 15:00:00 | 1/04/2013\|0\|632 |
| 16:00:00 | 1/04/2013\|0\|645 |
| 17:00:00 | 1/04/2013\|0\|561 |
| 18:00:00 | 1/04/2013\|0\|621 |
| 19:00:00 | 1/04/2013\|0\|776 |
| 20:00:00 | 1/04/2013\|0\|756 |
| 21:00:00 | 1/04/2013\|0\|758 |
| 22:00:00 | 1/04/2013\|0\|900 |
| 23:00:00 | 1/04/2013\|0\|920 |

In this example, the data represent a twenty-four hour monitoring period of hourly readings for one meter (meter ID is 0), showing the watt-hours consumed over each hour sample cycle. The time (00:00:00) is indicated first, followed by date (1/04/2013), followed by the meter ID (0), and finally the consumption amount (648). In other examples, different data may be generated, as the period, reading interval, number of meters, date, and consumption amounts may all vary. Additional data may also be generated or collected and presented.

In one example, the user interface 400 may provide additional functionality. For example, the user interface 400 may indicate a correctness verification in which the analysis results are examined to confirm whether they are correct. This also validates the performance/scalability results in one example. In another example, the user interface 400 may indicate a VEE result. The user interface 400 may also offer automatic comparison to benchmarks of other tests performed.

In other examples, other user interfaces may be utilized, with varying options and/or features. Moreover, the user interfaces may be laid out in various ways, with the user interface 400 being only one example.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A computing device comprising:
one or more processors;
a memory for storing machine readable instructions;

a data store;

a meter data management testing module stored in the memory and executing on at least one of the one or more processors to test a meter data management system using a data set of representative metering data and a user-generated test scenario specifying a plurality of metering parameters, wherein the representative metering data is associated with utility usage data of an advanced meter infrastructure (AMI), and wherein the test generates test data of the meter data management system; and a synthetic data generator module stored in the memory and executing on at least one of the one or more processors to generate a synthetic data set of representative metering data to be used by the meter data management testing module.

2. The computing device of claim 1, wherein the synthetic data generator module generates the synthetic data set based in part on an empirical data set.

3. The computing device of claim 1, further comprising:
a user interface module stored in the memory and executing on at least one of the one or more processors to receive a test scenario from a user.

4. The computing device of claim 3, wherein the plurality of metering parameters in the user-generated test scenario comprises at least one of a type of metering data, a number of meters, utility metrics, a recording frequency, a load type, a validation, estimation, and editing (VEE) preference, and a type of analysis.

5. The computing device of claim 4, further comprising:
an analytics platform module stored in the memory and executing on at least one of the one or more processors to perform an analysis of the data set based on the user-generated test scenario, wherein the analysis assesses a quality of the data set.

6. The computing device of claim 1, further comprising:
an analytics platform module stored in the memory and executing on at least one of the one or more processors to perform an analysis based on the data set of representative metering data and the test data of the meter data management system.

7. The computing device of claim 6, wherein the analysis assesses at least one of a response time and an accuracy of the meter data management system.

8. A method comprising:
receiving, at a computing system, a user-generated test scenario specifying a plurality of metering parameters, wherein the plurality of metering parameters in the user-generated test scenario comprises at least one of a type of metering data, a number of meters, utility metrics, a recording frequency, a load type, a validation, estimation, and editing (VEE) preference, and a type of analysis;

performing, by the computing system, a meter data management testing analysis of a data set representative of metering data based on the user-generated test scenario, wherein the metering data is associated with utility usage data of an advanced meter infrastructure (AMI), and wherein the data set is one of an empirical data set, a synthetic data set, and a hybrid data set made up of a synthetic data set and an empirical data set; and storing, on the computing system, a result of the analysis of the data set.

9. The method of claim 8, wherein the data set is a synthetic data set, further comprising:
generating, by the computing system, the synthetic data set representative of metering data.

10. The method of claim 8, wherein the analysis of the data set assesses a quality of the data set.

11. The method of claim 8, wherein the performing the meter data management testing analysis includes performing a test to evaluate the performance of a meter data management system based on the data set and the user-generated test scenario.

12. A system comprising:
one or more processors;

a user interface module executing on at least one of the one or more processors to enable a user to enter a testing scenario;

a meter data management testing module executing on at least one of the one or more processors to manage the testing scenario;

a data generator module executing on at least one of the one or more processors to generate data representative of metering data, wherein the metering data is associated with utility usage data of an advanced meter infrastructure (AMI), wherein the generated data is one of a synthetic data generated based on the testing scenario entered by the user, an empirical data set, and a combination of synthetic data created based on the testing scenario entered by the user and empirical data; and an analytics platform module executing on at least one of the one or more processors to analyze the generated data based on the testing scenario.

13. The system of claim 12, further comprising:
a meter data management engine module executing on at least one of the one or more processors to conduct a test of a meter data management system based on the generated data and the testing scenario.

* * * * *